United States Patent [19]
Vernois

[11] Patent Number: 5,771,143
[45] Date of Patent: Jun. 23, 1998

[54] DISK CARTRIDGE SYSTEM WITH REMOVABLE MODULES

[76] Inventor: Goulven Vernois, 78140, Velizy, France

[21] Appl. No.: 208,804

[22] Filed: Mar. 11, 1994

Related U.S. Application Data

[63] Continuation of Ser. No. 700,199, May 30, 1991, abandoned.

[30] Foreign Application Priority Data

| Nov. 30, 1988 | [FR] | France | 88 15673 |
| May 31, 1989 | [FR] | France | 89 07151 |

[51] Int. Cl.⁶ .......................... G11B 23/03; G11B 23/30
[52] U.S. Cl. .......................... 360/133; 369/291
[58] Field of Search .................. 360/133, 137; 235/492

[56] References Cited

U.S. PATENT DOCUMENTS

| 4,683,371 | 7/1987 | Drexler | 365/106 |
| 4,791,608 | 12/1988 | Fushimoto | 235/492 |
| 4,814,924 | 3/1989 | Ozeki | 360/133 |
| 4,822,988 | 4/1989 | Gloton | 235/492 |
| 4,825,283 | 4/1989 | Shino | 235/492 |
| 4,891,727 | 1/1990 | Sato et al. | 360/137 |
| 4,965,691 | 10/1990 | Iftikar et al. | 360/133 |
| 4,980,856 | 12/1990 | Ueno | 361/412 |
| 5,032,855 | 7/1991 | Taniguchi et al. | 354/21 |
| 5,049,728 | 9/1991 | Rovin | 235/492 |
| 5,113,297 | 5/1992 | Yoshida | 360/133 |
| 5,132,947 | 7/1992 | Kameda et al. | 360/133 |
| 5,159,182 | 10/1992 | Eisele | 360/137 |

FOREIGN PATENT DOCUMENTS

| 0206897 | 12/1986 | European Pat. Off. . | |
| 0266101 | 10/1987 | European Pat. Off. . | |
| 0265167 | 4/1988 | European Pat. Off. . | |
| 0275657 | 7/1988 | European Pat. Off. . | |
| 871596 | 2/1979 | France . | |
| 59-56267 | 3/1984 | Japan . | |
| 60-15880 | 1/1985 | Japan . | |
| 63-48677 | 3/1988 | Japan | 360/133 |
| 63-71993 | 4/1988 | Japan | 360/133 |
| 63-291282 | 11/1988 | Japan | 360/133 |

*Primary Examiner*—Jefferson Evans

[57] ABSTRACT

Un support, disk (1) or group-holder (48), having one or several housings able to temporarily receive one or several independent electronic objets (M), which can introduce this or these independent electronic objets (M) into a disk-reading device, inside which is located a head connection (35) which cooperates with connectors (56) of the support (48) or connectors (14) of the independent electronic objet (M) temporarily integral with the support (1), so that this or these independent electronic objets (M) can communicate with the disk-reading device.

4 Claims, 9 Drawing Sheets

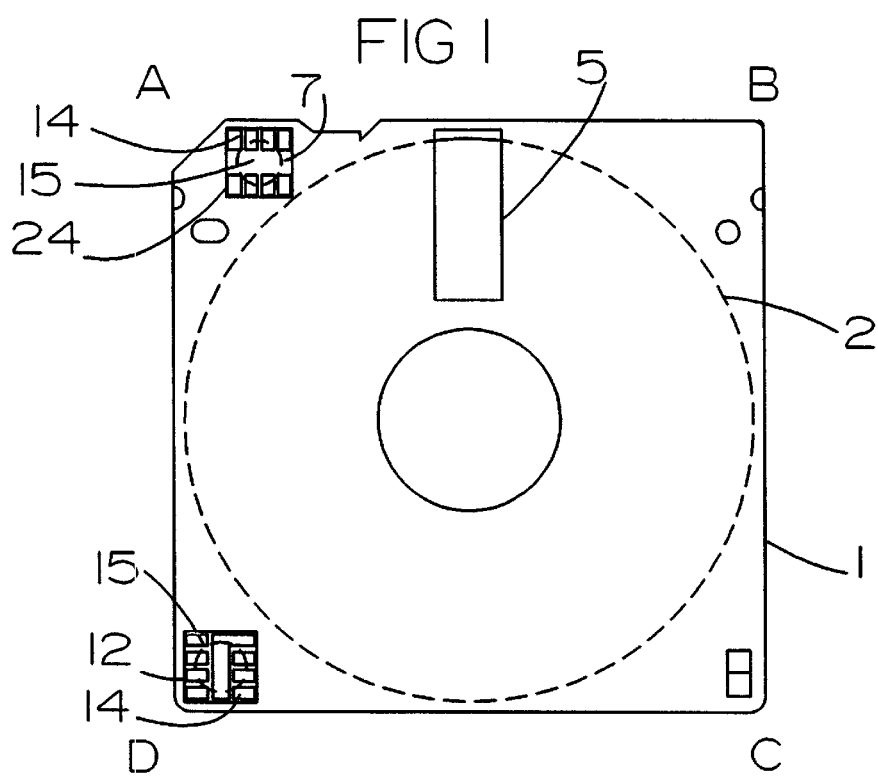
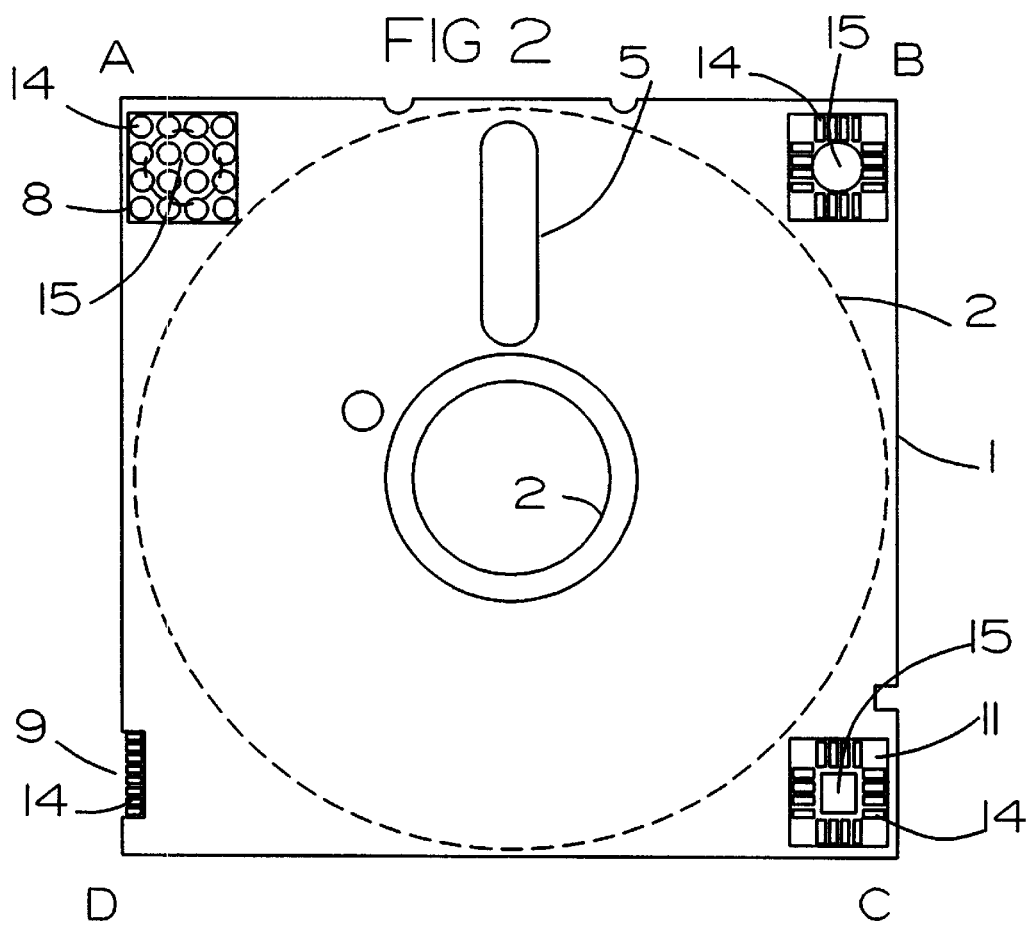

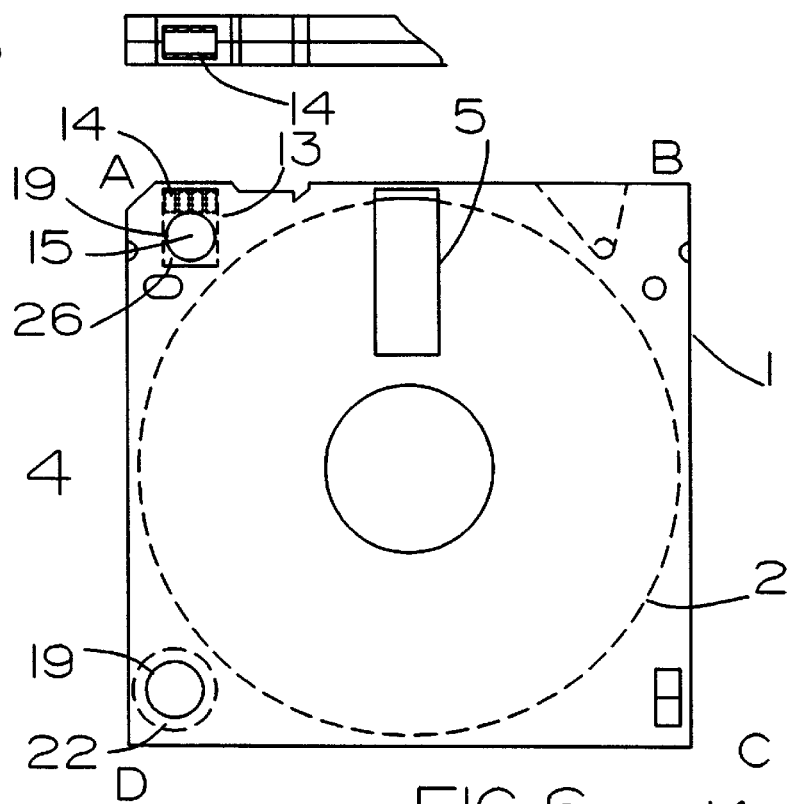
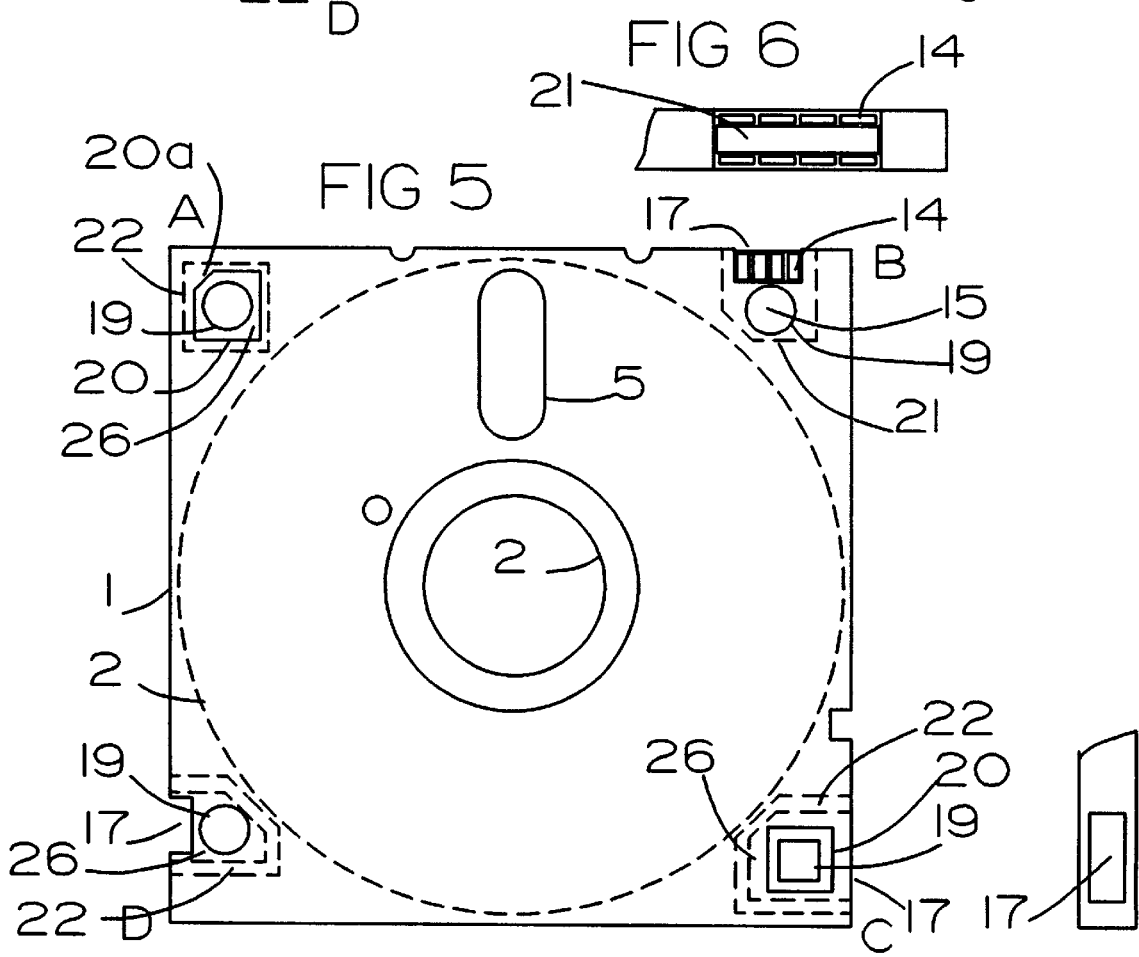

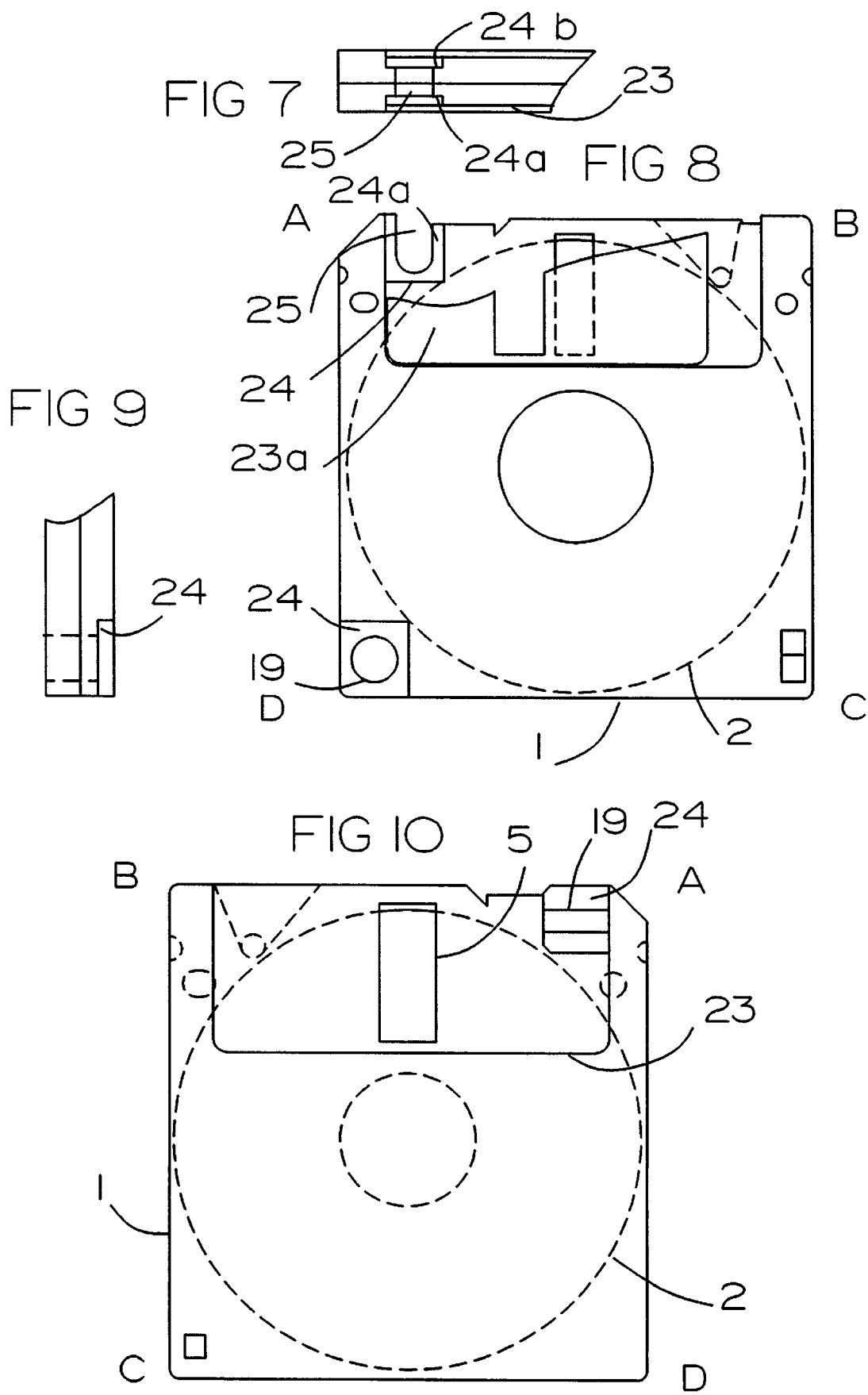

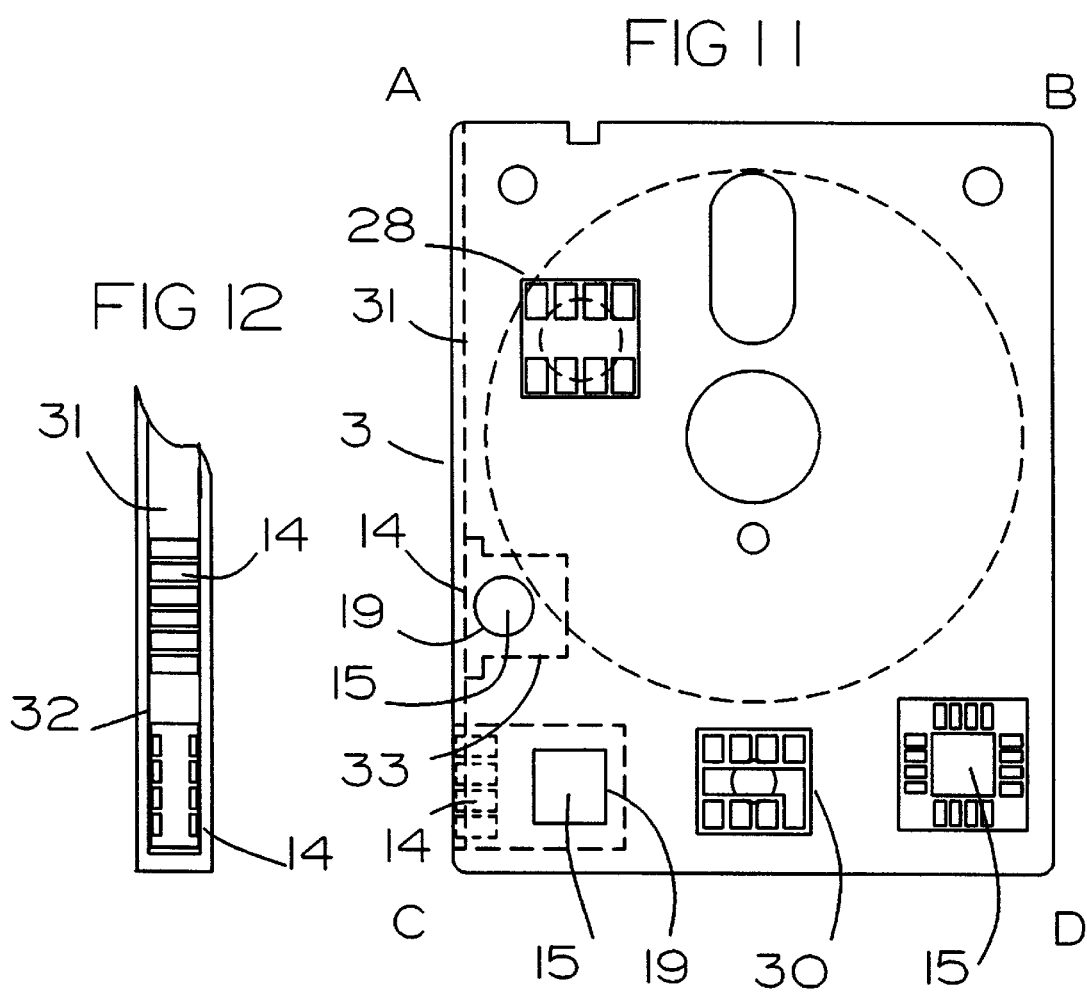
FIG 11
FIG 12
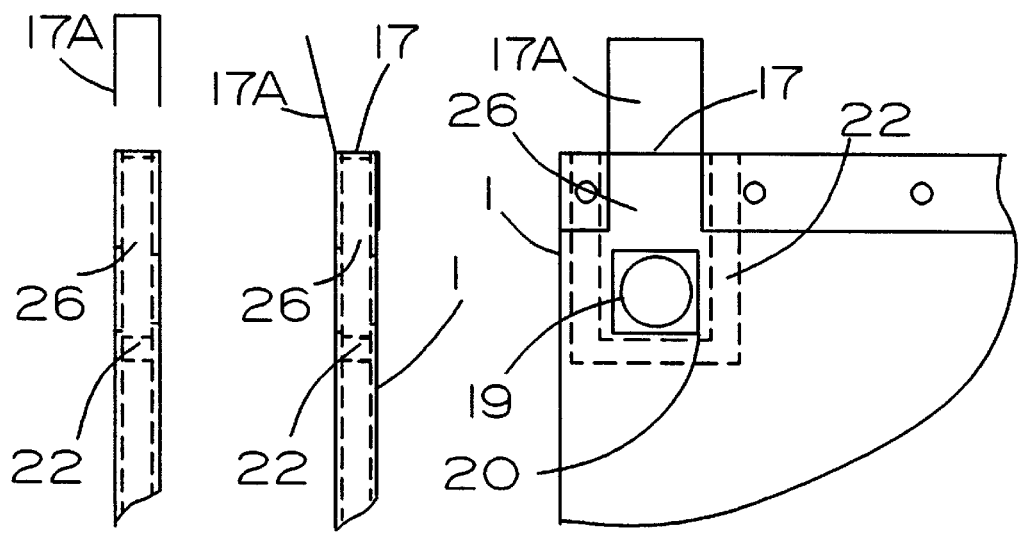
FIG 13  FIG 14  FIG 15

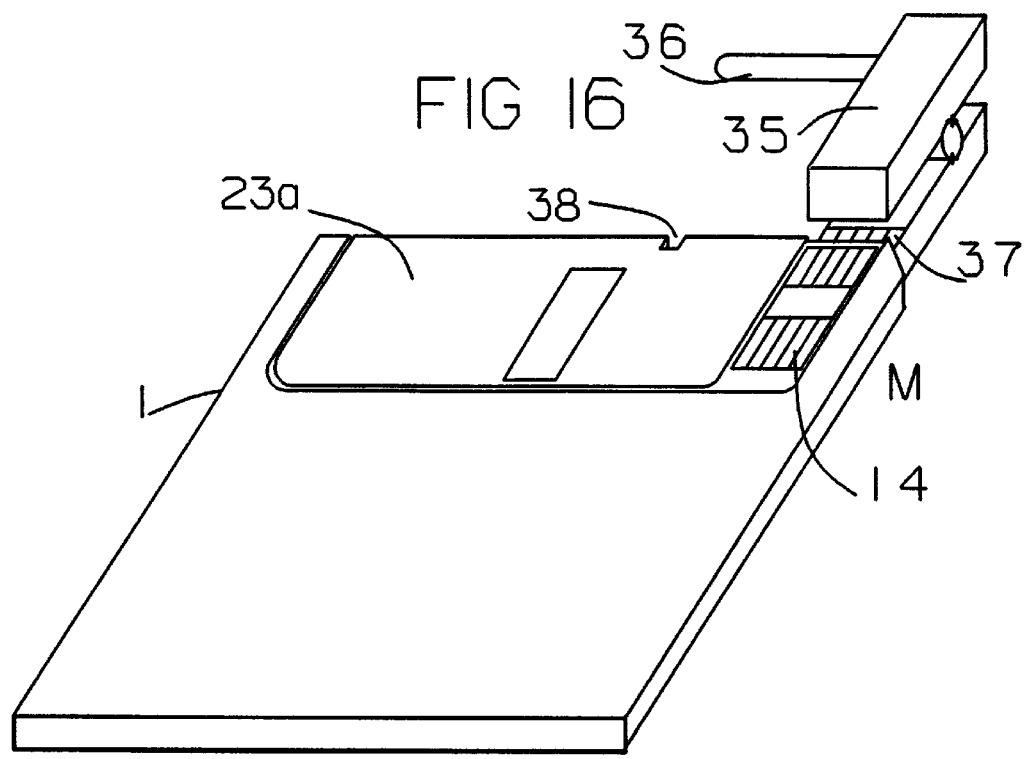
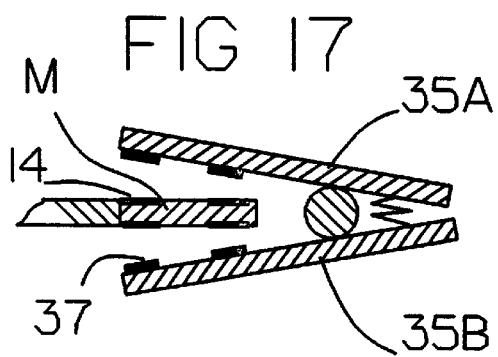
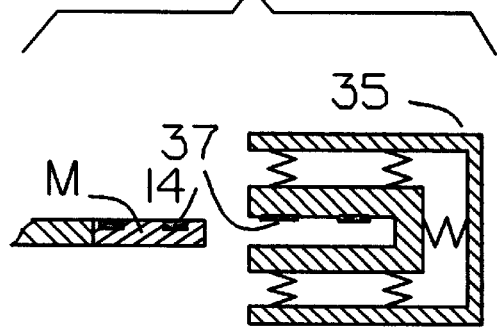
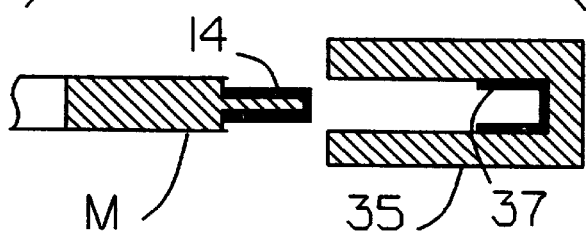
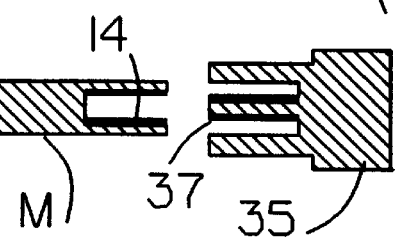

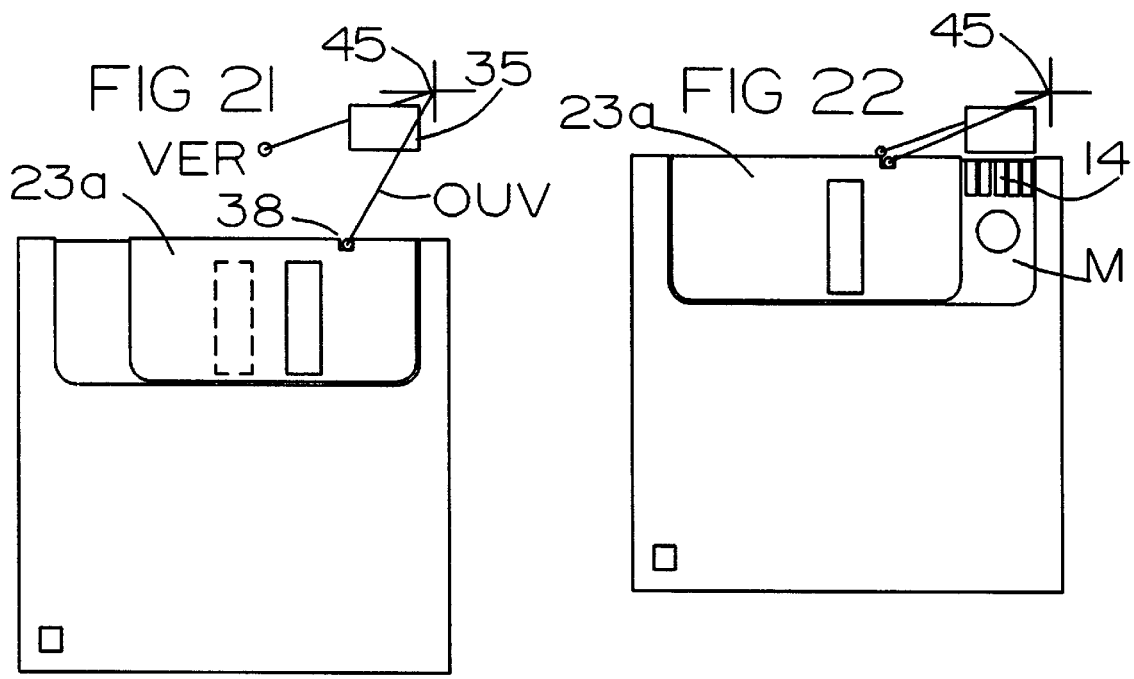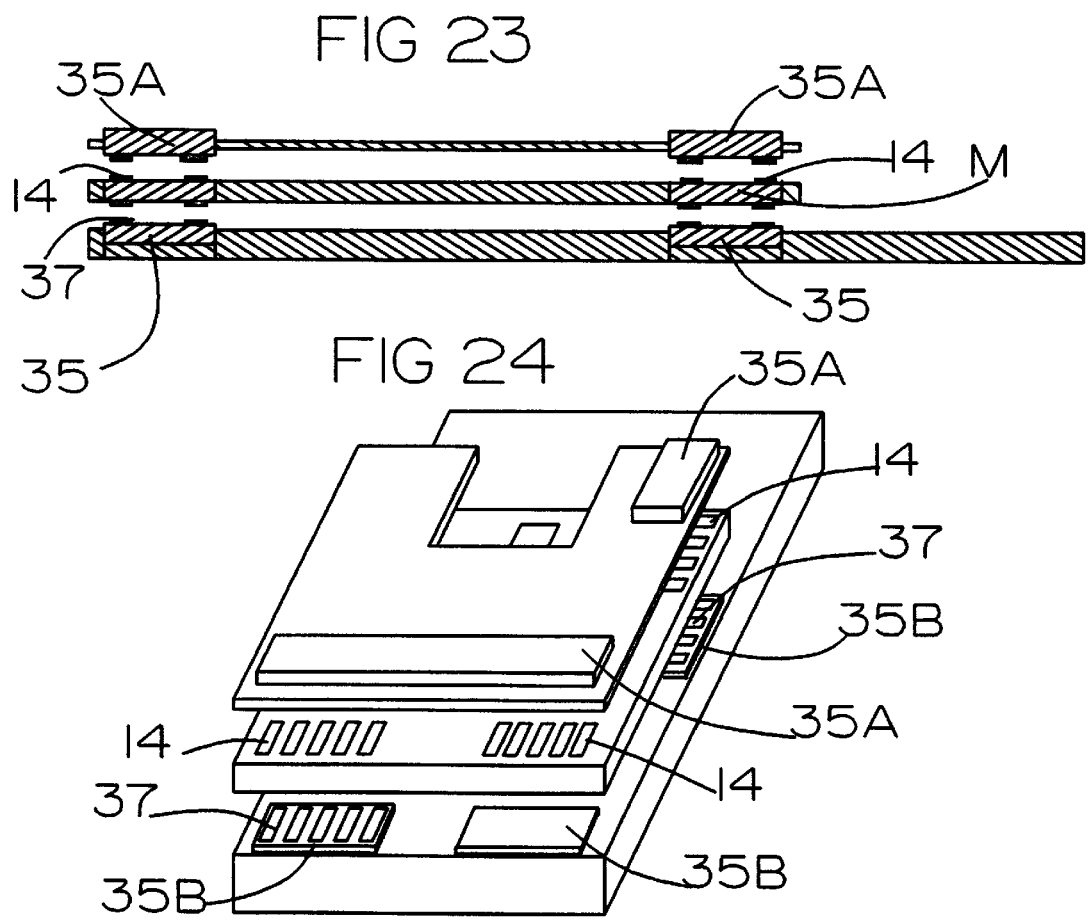

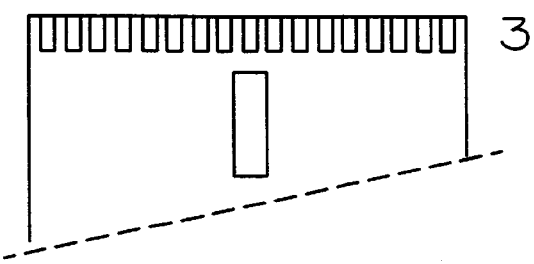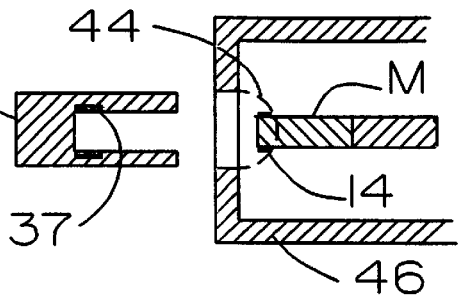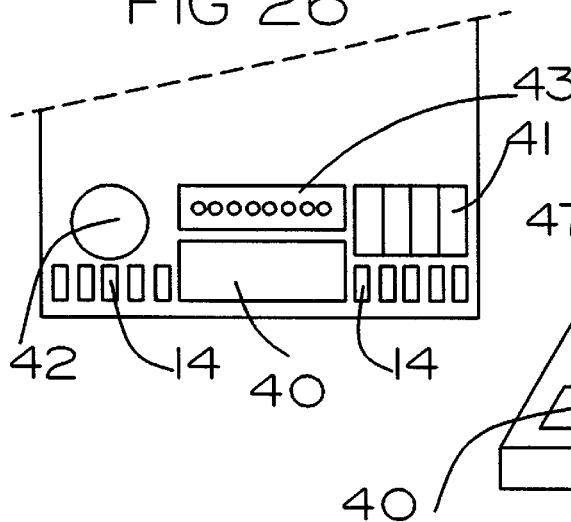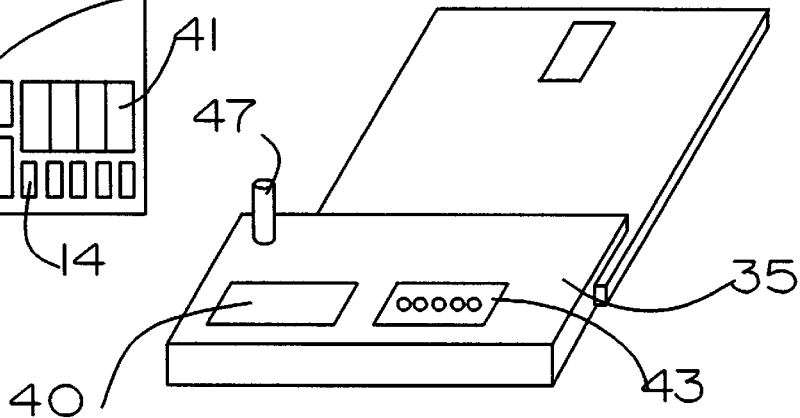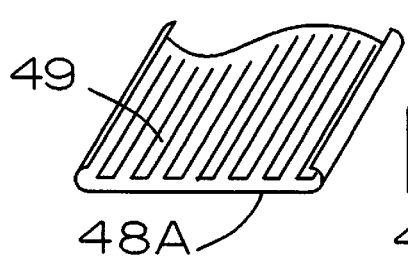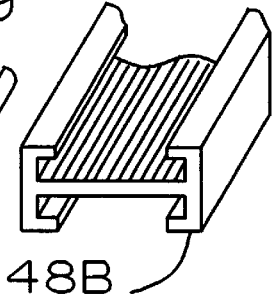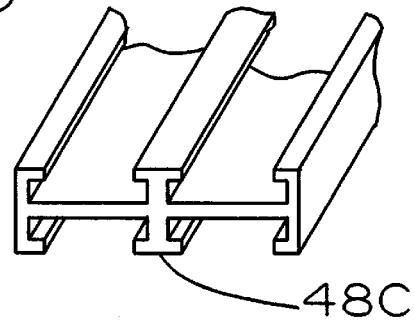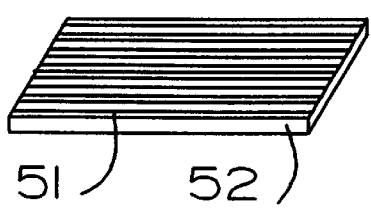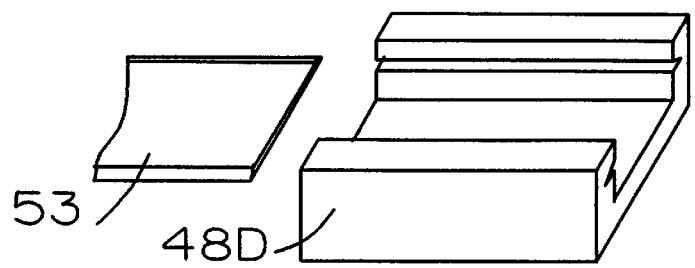

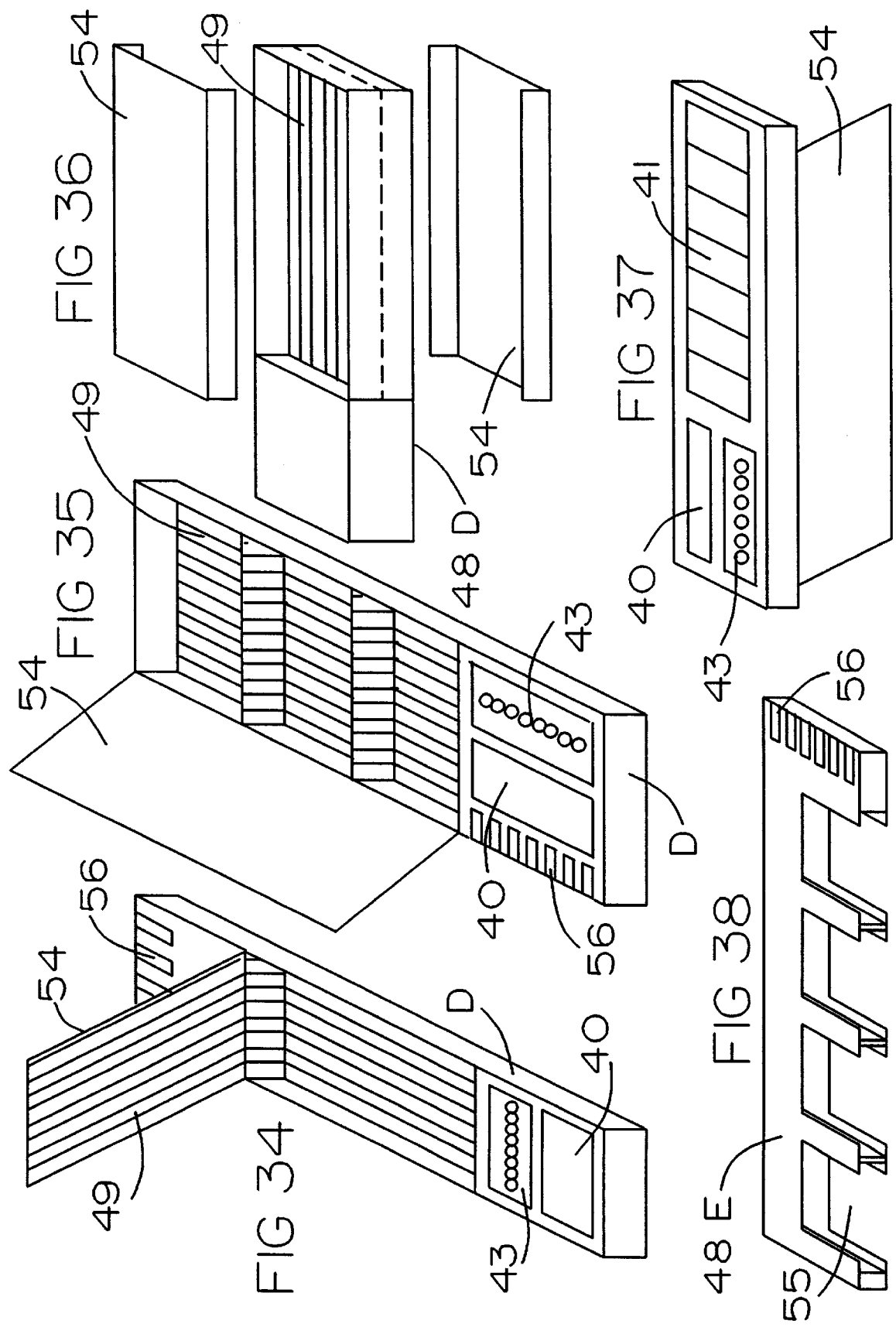

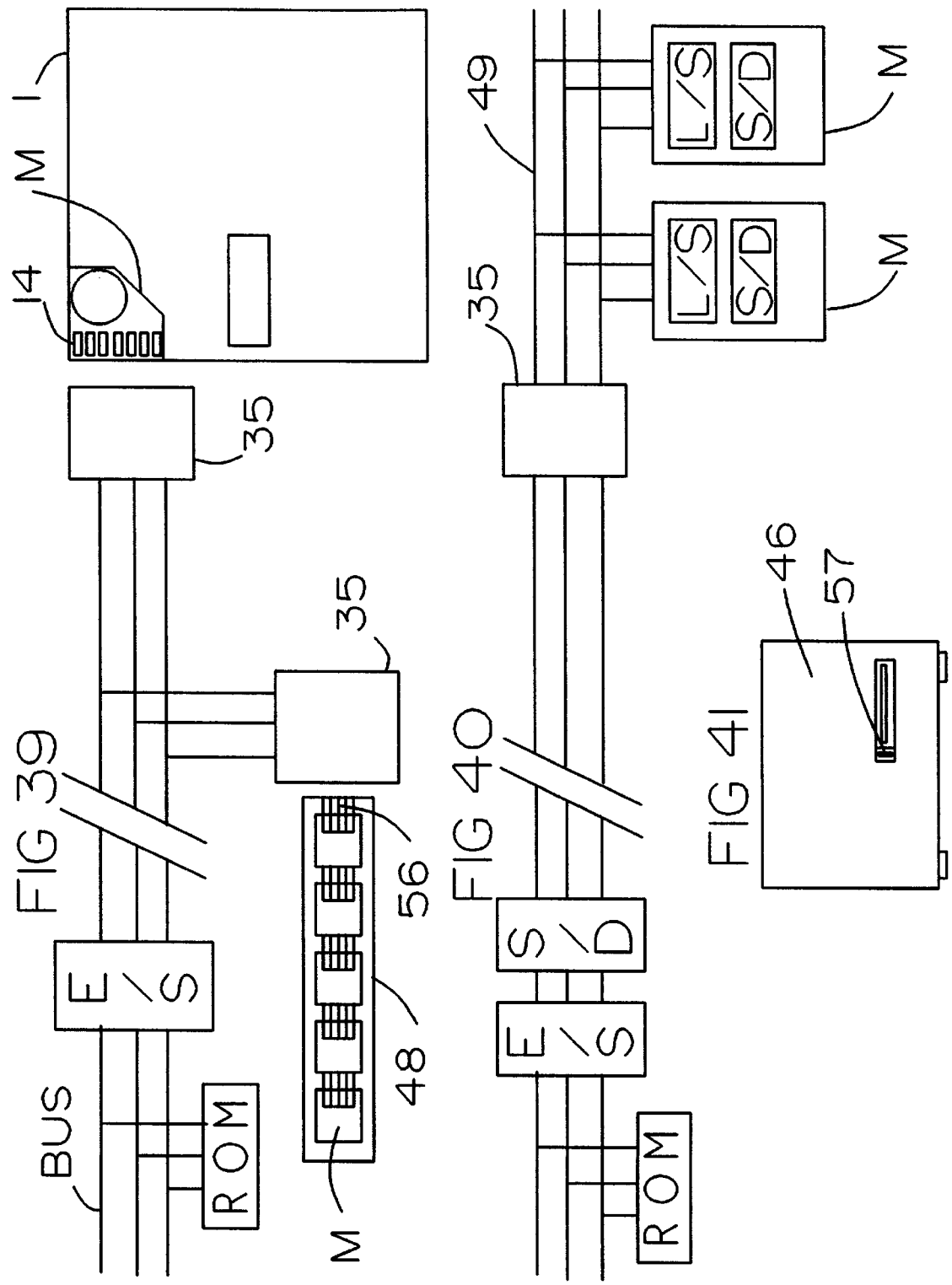

DISK CARTRIDGE SYSTEM WITH REMOVABLE MODULES

The present application is a continuation of Ser. No. 07/700,199 filed May 30, 1991, now abandoned.

BACKGROUND OF THE INVENTION

1. Field of the Invention

The present invention refers to memory systems which use two memories of different types.

2. Description of the Related Art

Numerous solutions have been offered in several domains in order to associate two memories of different types, so as to increase the possibilities of each single memory.

Memory cards

Memory cards possessing both a magnetic track and a chip, are well known and in universal use.

Aigo Seiichiro (FR 2,538,390, Jan. 5, 1983), Gloton (FR 2,590,051, May 15, 1987, U.S. Pat. No. 4,822,988, Apr. 18, 1989), describe information cards with one removable chip, and Rovin (U.S. Pat. No. 5,049,728, Sep. 17, 1991) describes information cards with several removable chips, bus nothing says that the card has a magnetic track.

Iida (Hitachi Maxell Limited) (EP 0 275 657, Dec. 11, 1987) describes a composite memory card having an optical track and a semiconductor memory.

Photographic film cartridge

Tanikawa (Olympus) (U.S. Pat. No. 4,500,183, Feb. 19, 1985) describes a photographic film cartridge with either a magnetic track or an integrated semiconductor element attached.

Tanigushi (Minolta) (U.S. Pat. No. 5,032,855, Aug. 3, 1990) makes the semiconductor element described by Tanikawa removable.

Magnetic tape cassettes

Staar (BE 871,596, Feb. 15, 1979) describes the integration of a semiconductor element into a magnetic tape cassette in order to memorize the tape position at a given time.

Dupré (FR 2,633,086, Jun. 20, 1988) teaches the use of such an integrated semiconductor element for coding and decoding digitally recorded music, in order to make a digital copy impossible.

Computer applications

Gordon and Reichmann (U.S. filed 263,833, Oct. 28, 1988, WO 90/04847, May 5, 1990), introduce into the disc-reading device an electronic device called a coupler, able to communicate with the reading-writing head of the disc-reading device.

Eisele (U.S. Pat. No. 5,159,182, Oct. 27, 1990), describes an electronic disc also able to communicate with the reading-writing head, similar to Gordon and Reichmann.

Parent (Microphare) (FR 2,610,744, Feb. 05, 1987) associates to a mass memory a semiconductor element, a well known "key", which is usually placed by the user on an outside port of the computer.

Gardiner (WO 85/02696, Dec. 6, 1984) and Guerri (FR 2,622,319, Oct. 27, 1987) teach a well known device using I.C. cards which can be grouped on a multiple reading device connected to an outside port of the computer by means of a flexible conductor.

Computer applications with a connection head inside the reading device

Hiroshi (Canon KK) (JP 60 15,880, Jan. 26, 1985) describes a semiconductor device integrated into a disc and which contains the disc directory.

Tomohide (Hitachi LTD) (JP 63 71,993, Apr. 1, 1988) describes a disc which contains semiconductor elements, conductor wires and connectors.

Kameda (Matsusshita Electric industrial Co) (EP 0 332,170, Mar. 8, 1989) teach a combined memory into which two memories of different types are explicitly bound onto the same cartridge.

Oseki (Hitachi Maxell limited) (U.S. Pat. No. 4,814,924, Mar. 21, 1989) describes semiconductor devices integrated into a magnetic disc.

Iida (Hitachi Maxell limited) (EP 0 275, 657, Jul. 27, 1988) takes over Ozeki's description and applies it to an optical disc.

Yasuo (Nippon Victor KK) (JP 59 56,267, Mar. 31, 1983) describes a disc in in which the front part, referred to as a cover, is removable as a whole. This cover possesses integrated semiconductor elements and connectors. When the cover is removed, the magnetic element is exposed to dust, and it does not appear that the disc can be used, nor even stored, without its cover on.

Dupré (FR 2 633 086, Jun. 20, 1988) describes a semiconductor device integrated into a cartridge of a disc medium memory.

Takashi (Hitachi Limited) (JP 63 48,677, Mar. 1, 1988) describes a disc upon which an I.C card is attached.

This association of a I.C. card and a disc simplifies the difficult problem of integrating electronics circuits and connectors in the disc cartridge at the production stage, as has been described in the patents discussed above.

SUMMARY

In these devices, the module is closely linked to the mass storage cartridge.

This constraint makes it unpractical, or even a real problem, to obtain a backup copy and/or allow use of a file divided among several mass storage elements.

SUMMARY OF THE INVENTION

The object of this invention is to allow the use of such devices and to obtain backup copies and/or the use of files distributed among several mass storage elements.

The object of this invention is achieved by designing discs or other mass storage elements, in a such way as to enable them to receive one or several modules, either in an irreversible and mechanically strong way, or with the possibility to remove them, or independently. These modules consist of integrated circuits, microprocessors, read only memories, random access memory, connectors, data input devices, display devices and feeding devices, the use of the mass storage elements remaining possible with or without said modules.

The object of this invention is achieved particularly by modifying, in this manner, present mass storage elements. It will then be possible to use them in either presently existing reading devices, or in improved reading devices which will take the modules in account.

This embodiment, according to the invention, allows entirely dissociation of the mass storage elements from the modules, hence allowing the independent development of modules with various prices and capacities, able to be adapted as needed on the very standardized mass storage elements, the price of which should not significantly exceed the price of non-improved equivalent mass storage elements.

This embodiment allows the making of one or several backup copies, while copyrights or secret are protected by the module.

This embodiment allows, according to the invention, to notably increase disc security, by physically separating, and separately storing the mass storage elements and the modules.

If one wishes to regroup two or several modules coming from different discs on one single holder, and/or directly connect two or several modules, this embodiment then also allows a practical use of files spread among several mass storage elements.

We define as module-housing a physical design of the mass storage cartridge, and in particular discs and floppy discs, which is made in order to allow the introduction, at the user's convenience, of modules as described above. The presence of said housing does not alter the original possibilities of the mass storage elements.

We shall describe, without limiting the scope of the invention, the incorporation of modules to floppy discs and the necessary modifications necessary in order to create the corresponding housings on said floppy discs.

The circular magnetic disc is contained in a square or rectangular cartridge, (see FIGS. 1, 2 and 8), made of cardboard or plastic. Among the available sites, the corners A, B, C and D of the cartridge are privileged, this not being a limitation.

Several connector 14 arrangements are possible and their number may vary according to whether the information is flowing in parallel or in serial mode.

The disc cartridges are thick enough to allow placing connectors 14 on both faces, either outside or inside the cartridge, as shown on FIGS. 1, 3 and 5.

The connectors 14 surface is, generally, in a plane parallel to the plane of the magnetic disc, inside or outside the boundary planes of the cartridge, or perpendicular to this plane, outside the edge of the cartridge. These different solutions may be combined in order to warrant the best possible contacts between the module and the central unit. The modules are fixed to the cartridge by adhesive bonding, welding, screwing, riveting, fitting, springing, or any other means of assembly, with or without the possibility of later removal.

The various types of housing which are described below can be placed in the different possible locations and on different types of floppy discs or hard discs.

The link between the module M and the computer is provided, according to the invention, by means of connection head 35, linked to the drive, or independent thereof, and linked to the computer bus by a bus 36 (FIG. 16).

The individual connectors 37 of said connection head 35 are placed in contact with, or in front of the connectors 14 of the module (FIGS. 16 to 20).

The words individual connectors mean here any device which can transmit or receive energy or information, the connection head transforming, if needed, the information or the energy into the form of current or voltage compatible with the computer or the module.

The only condition imposed on the connection head is not hindering the normal functioning of the disc and its drive.

A close examination of the drives shows that these devices have ample available volume and surface which can be used to install connection heads in the four corners, on both faces and on four sides, without any important modification of said drives.

We shall describe in greater detail the changes made, according to the invention, to the front right corner of the 3.50-inch floppy disc, this example implying no limitation to the scope of the invention.

3.50-inch drives have a device controlling the locking and the ejection of the floppy disc, and which presses upon the front edge of the floppy disc, precisely where the connectors would be.

This device will be moved or modified so that it does not deteriorate the connectors nor impede the motion of the shutter, extended according to the invention.

In particular we often find two lever arms in contact with the right front edge of the floppy disc, and which rotate freely around a vertical axis 45, namely the lever arm OUV which opens the shutter, and the lever arm VER, the function of which is to lock and to eject the floppy disc. In the original device the lever arm VER, shorter then the lever arm OUV, presses the floppy disc right edge. The disc is physically touched and then pushed in the last four or five millimeters of the floppy disc motion course.

According to the invention, as shown on FIGS. 21 and 22, the arm lever VER can have the same dimension as the lever arm OUV. Its extremity is pushed by the lever arm OUV from a rest position PA.

The lever arm OUV, pushed by the floppy disc, will come in contact with the lever arm VER and will push it to lock said floppy disc.

In order to prevent the shutter from being submitted to dangerous stress during the disc locking period, the shape of the front edge of the floppy disc is so designed that during the locking period the opening lever arm leans on said front edge, and not on the shutter only.

The contact between the connectors 37 of the connection head 35, and the connectors 14 of the module can be obtained, according to the invention, either during the locking period by penetration of the floppy disc into the connection head, or penetration of the connection head into a housing in the floppy disc during the period of time when the lever arm VER is in motion, or at the end of said period of time, when the floppy disc is already in place, and is locked when the upper and lower parts of the drive are put close together, or successively when the floppy disc gets into the right position, and when it is taken by the drive (FIG. 23). This can be advantageously embodied by dividing the connection head into two parts, namely the upper part 35A and the lower part 35B, and making the upper part of the connection head integral with the upper part of the floppy disc locking device in the drive, its lower part being integral with the drive platen.

This is also embodied by making the connection head integral with the single moving part of the disc locking device, or of the drive platen only, a complementary part 35C being designed to compensate for the possible stress of the connection head on the floppy disc (FIG. 23). This is also embodied by a connection head in two parts 35A and 35B, between which the floppy disc is introduced. These two parts then close together and press the module, once the floppy disc is in the right position (FIGS. 17, 23 and 24).

The connection head, according to the invention, possesses the characteristic not to be rigidly linked to the drive, having springs 39, (FIG. 18), in order not to produce on the floppy disc any stress which could deform it or hamper its normal functioning, unless said connection head has been designed by the constructor of the drive to participate in the positioning of the floppy disc.

In particular, in a case where the connectors are on the surface on one side only, the pressure exercised by the connectors will be absorbed by the head itself on the other side.

In order to allow the interchangeable use of conventional floppy discs or of floppy discs fitted with a module, and considering that the connection head would tend to enter a housing which does not exist in the conventional floppy disc, said connection head will be able to move back far enough, according to the invention, for the floppy disc with no housing to be able to reach a correct position; a spring holding said connection head ensures its penetration into the housing of the floppy disc, when this housing does exist.

All the arrangements which have been described so far were referring to commercially available floppy discs. However, and without departing from within the scope of the invention, we can re-arrange in a different lay-out the several elements of the floppy disc and of its module, in order to obtain a floppy disc better adapted to the use of the module and of its added elements.

We can in particular,according to the invention, locate the magnetic disc away from the front edge or from the sides of the floppy disc, and farther inside, thus clearing room, where the connectors and the module can then be placed, either along the whole length of this edge, or along only part of it, in one single or in several elements, if we maintain a protecting shutter for one or several windows.

An input-output controller E/S ensures the branching of the computer principal bus towards the connection head 35 by means of a bus 36. For reasons of simplicity and reliability of the bus 36 of the connection head, a staticizer-dynamicizer S/D is placed near the controller E/S, either before or after, so as to lower the number of conductors in the bus 36 and the number of connectors of the head and of the modules. Or, the connection head can be active, and possess, according to the invention, self-testing devices for connections and modules, a logic of selection L/S, a keyboard 43 and a display 40.

The staticizer-dynamicizer can be located close to the connection head, but to simplify the link between module and connection head, or, in case several modules are united on the same group-holder, the link between group-holder and connection head, it is preferable to place a staticizer-dynamicizer in every module.

Different configurations are presented on FIGS. 39 and 40. Simplified schemes of the connection head are presented by FIGS. 16 to 28. They are only given as illustrations, as practical lay-outs can vary.

The connection head are fitted, according to the invention, with an anti-stress device 39, unless they are integrated, according to the invention, to the floppy disc drive with a particular function of positioning the floppy disc. (FIG. 18).

We know that one has described and built a great number of electronic devices of the module type, composed of particular circuits, of microprocessors, of memories, of batteries or photo cells, and of keyboards and displays, particularly used for hand calculators or credit cards or any other specific uses.

Also, numerous devices and procedures based upon secret keys have also been designed to allow these devices to be used only by authorized persons or by a hierarchy of authorized persons.

The module, according to the invention, either simple or fitted with a keyboard and a screen, either incorporated into a floppy disc or removable, can possess all the general characteristics of such modules. It generally receives its data from the computer to which it is linked, or from its own keyboard if it is fitted with one.

It has in a read only memory (ROM), or just in a permanent or erasable storage, the necessary data which allow it to fulfill its various functions and in particular secret keys, coding and decoding programs, transfer programs, comparison programs, and programs authorizing or denying its access to readers, this enumeration not being restrictive and implying no limitation to the scope of the invention.

It can also possess only a permanent storage which contains one or several file-reading devices and used directly by the computer, or which can work only after introducing a secret key into the computer.

The connection head can be, according to the invention, just a simple passive support ensuring the linking of the modules, these modules having their own logic of selection L/S and their own staticizer-dynamicizer S/D.

We can use the module, according the invention, in numerous ways. We will describe here some of these ways, these being examples of embodiment which are not in any case limitations of the invention.

BRIEF DESCRIPTION OF THE DRAWINGS

FIG. 1 shows 3.5 inch disc, modules and pins 14.

FIG. 2 shows 5.25 inch disc, modules and pins 14.

FIG. 3 shows 3.5 inch disc, module 13 in housing 26 and pins 14.

FIG. 4 shows 3.5 inch disc.

FIG. 5 shows 5.25 inch disc with several housings.

FIG. 6 shows indentation 17, module 21 and pins 14.

FIGS. 7 and 8 show 3.5 inch disc with an indentation housing 24–25.

FIG. 9 shows in corner D a housing 19,24.

FIG. 10 shows in corner A a housing 19,24.

FIGS. 11 and 12 show modules and housings.

FIGS. 13, 14, 15 show housing 26 with shutter 17a and holes 18 and 19.

FIG. 16 shows a perspective view of the disc and connection head.

FIGS. 17, 18, 19, 20 show several connection heads.

FIGS. 21 and 22 show indentation 38.

FIGS. 23 and 24 show a disc within a into schematic reading and writing device.

FIG. 25 shows pins 14.

FIG. 26 shows module with pile, photo cell, display, keyboard and pins.

FIGS. 27 and 28 show connection head with display, keyboard and pins.

FIGS. 29 to 37 show group-holder 48.

FIG. 38 shows U type group-holder 48.

FIGS. 39 and 40 show BUS.

FIG. 41 shows computer and incorporated reading and writing device.

DESCRIPTION OF THE PREFERRED EMBODIMENTS

FIRST PREFERRED EMBODIMENT

FIG. 8 shows in corner A a housing 24–25 formed by one deep indentation 25 in the cartridge edge, complemented by two superficial recesses 24a and 24b.

The chip is housed in the deep indentation 25, the connectors 14 in the first superficial recess 24a and the chip radiator in the second superficial recess 24b.

Thus, the module perfectly fits its housing.

The module can be protected by the window shutter, consequently extended.

SECOND PREFERRED EMBODIMENT

FIGS. 3 and 4 show in corner A a housing accessible by the edge of the cartridge and with two holes 19 for ventilation.

The module is adhesive-bonded, or clipped into the ventilation holes, which are made to the shape of the chip 15. The elasticity of the cartridge casing will keep the module in place.

FIG. 5 shows in corners B and D a housing 26 preceded by an indentation 17 and if necessary with a distance piece 22 providing tightness when the module is not in place.

This housing allows the module contacts 14 to be seen. The module can be adhesive-bonded, or be kept in place by the holes 19, the chip 15 and the elasticity of the cartridge casing.

Corner C of FIG. 5 and FIGS. 13, 14 and 15 show a housing formed by an aperture 17 on the cartridge edge, a distance piece 22 which keeps a space between the casing walls, one having a hole 20 and the other one another hole 19, providing ventilation of the chip.

The module is inserted through the cartridge edge aperture 17. It is guided into place by the distance piece 22, by the hole 19 which receives the chip, and by the hole 20 which allows seeing the connectors and eventually one side of the chip.

The module is adhesive-bonded, or is kept in place by an adhesive tape which obturates the aperture 17 and keeps the module in position in its housing, or by a shutter 17a, which may be attached to or independent from the cartridge casing.

THIRD PREFERRED EMBODIMENT

FIG. 1 shows a 3.5-inch floppy disc of a type used on many computers, and particularly on IBM-PC-compatibles.

A module 7, with eight identical connectors is in place in corner A. The connectors 14 can be seen on the surface, and the chip 15 be can seen on the other side through a hole 19 which allows its ventilation.

The module is glued flat in a housing 24. It may be located either far enough below the surface of the cartridge, so that the connectors 14 can be covered by the closing shutter 23a of the reading window without physical contact, or just below that surface, so that the connectors are level with the surface, in which case the connectors are parallel to the reading window.

In corner D, a module 12, of the type in use at France Telecom, has its connectors perpendicular to the window.

FIG. 2 shows a 5.25-inch floppy disc, with a cardboard or plastic flexible cartridge.

In corner A, a module 8, with sixteen round-shaped connectors 14 can be seen. In corner B, a module 10, with sixteen rectangular connectors 14, and a round-shaped chip is visible on both sides, for better cooling.

FIGS. 3 and 4 show a 3.5-inch floppy disc with a module 13 attached. Its eight connectors 14 are located opposite each other inside the cartridge.

The chip 15 can be seen on both sides through holes 19 which provide ventilation.

FIG. 5 shows a 5.25-inch floppy disc. A module 21 is attached to the cartridge 1 in the indentation 17. The connectors can be seen in this indentation 17, on both sides of the module 21.

There may be either n connectors 14 on each side, in which case they are 2n connectors on the module, or n connectors located on the edge of the module, resulting in n connectors for the module.

FIG. 6 shows a module with two times four connectors. The chip can be seen in the holes 19. The modules are adhesive bonded to the cartridge. The housing 26 shown in corner A, FIG. 5, is formed by the space inside the cartridge casing and, if necessary, by the distance piece 22, and by two holes of different dimensions and if necessary of different shapes.

One hole 20 has an orientation mark 20a and is larger than the other hole 19.

The module is adhesive-bonded onto the inner side of the lower casing, the chip being housed in the hole 19 of the casing, the thickness of which is eventually increased by the thickness of the distance piece 22. The connectors are accessible as in the lay-outs 7 and 12 of FIG. 1, and the lay-outs 8, 10 and 11 of FIG. 2.

The module can be provided with contact adhesive on one side, which will make it easy to affix it like a sticker onto the floppy disc housing.

Among the adhesive commercially available, some are strong enough to make it impossible to pull out the module without damaging the floppy disc, thus making it inseparable, while other adhesive will allow separating the module from the floppy disc and affixing it to another, should the first floppy disc be deteriorated for any reason.

FIGS. 8 and 9 show in corner D a housing 19–24 formed by a hole 19 and a superficial recess 24. The chip is housed in the hole 19 and is ventilated from the opposite side. The connectors are housed in the superficial recess 24. The module is affixed by adhesive-bonding. FIG. 10 shows in corner A a housing 19–24 formed by a hole 19 housing the chip and a superficial recess 24 housing the connectors. The upper right corner A, which is cut at a 45°-angle is left free.

FOURTH PREFERRED EMBODIMENT

FIG. 11 shows a 3-inch floppy disc. Its main characteristic is its oblong shape, leaving ample room between the magnetic disc and the cartridge edge, while the front edge is unavailable because of holes. This floppy disc must be turned around for two-sides reading. There is enough room available to install every variety of module and housing. The cartridge thickness of five millimeters allows housing the modules in the part of the cartridge just under the magnetic disc.

When compared to a 3.50-inch disc, there is an additional thickness of about 0.9 mm on each side of the magnetic disc. The thickness of the cartridge casing being about 1 mm, there is enough room to house a module having its connectors on its surface, of the type used on France Telecom cards.

One advantage gained from locating the module under the magnetic disc is the ventilation of the chip by air carried along by the rotation of the magnetic disc.

A drawback would be the possible need of a magnetic screen. FIG. 11 shows a module 28 entirely or partly located in the magnetic disc area, and directly adhesive-bonded on either the original cartridge side, or on a superficial recess 24 on the same side, slightly below the original surface level, the chip being housed in a hole 19, just under the magnetic disc.

FIGS. 11 and 12 show a module 33 housed inside the 3-inch cartridge. Its connectors are seen on the bottom 31 of the floppy disc guiding-channel 32. One or two holes 19 on one of the sides, or on both, provide the housing of the chip 15 and its ventilation.

The module 29 is placed according to one of the lay-outs described above. As the floppy disc must be turned around to read the second side, the module 30 is located along the axis of symmetry of the floppy disc and can have identical sets of connectors symmetrically located, so that after the floppy disc is turned around, the new set of connectors is equivalent to the former. Hence, one single connector device on the drive is sufficient.

FIFTH PREFERRED EMBODIMENT

A certain type of 3-inch floppy discs, used in particular by AMSTRAD, mentioned here as an example only, presents the advantage of an available interior room of about twenty millimeters between the magnetic disc and the rear edge of the floppy disc.

In this space, it is possible to arrange, according to the invention, one or several modules and connectors, according to various lay-outs. It is even possible to place, as per FIG. 26, and without departing from the scope of the invention, additional elements, such as a liquid crystal device 40, a solar cell 41 or batteries 42, a keyboard 43, the keys of which can be accessed with a small pointed object, these additional elements permitting to feed the module, according to the invention, with confidential data which can remain unknown to the computer.

These additional elements can be directly incorporated to the module or can be located in some other place on the floppy disc and linked to the module by a bus, which can be a metal deposit on said floppy disc. This free space of said 3-inch floppy disc can be prepared, according to the invention, to temporarily receive the module and the additional elements which have been described above.

The liquid crystal devices, of the model generally used for small calculators, are very strongly built and easily allow to hold the calculator they are a part of.

The module connectors can be placed, according to the invention, on the rear side of the floppy disc, by which the floppy disc is pushed into the drive. See FIGS. 26, 27 and 28.

According to the various floppy disc sizes and drive models, the floppy disc introduction slot is fitted with a shutter, or with a simple device with a slit, which makes it tight in the absence of a floppy disc. This shutter or this narrow slit, have no impact upon the work of the floppy disc or of the drive, and are generally part of a device easily removed from the drive.

Removing it makes considerable space available 44, and brings to light the rear side of the floppy disc, in its full width, and in a depth of 10 to 15 millimeters.

To allow the connection head 35 to connect itself to the module connectors located on said rear side of the floppy disc, said connection head is placed, according to the invention, (FIGS. 27 and 28) on the front side 46 of the drive or of the computer, and eventually partly or totally outside the drive, but remains mobile, so as to be able to adapt its final position on the rear side of the floppy disc, eventually by inserting the movable plate of the drive, and in order to follow its vertical locking motion. That vertical locking can sometimes be brutal, and can be softened by a mechanical means of the former art. This movable connection head will be linked to the drive, according to the invention, by a flexible or articulated link, and in the absence of the floppy disc, it will keep the drive tight.

The flexible link can be a mechanism articulated around a shaft 47, a flat conductor, a groove, or any other well known device, or a combination of these devices, this description not limiting the invention.

The considerable advantage of these arrangements, according to the invention, is that they necessitate only a few modifications of the drive and make use of all the rear side of the floppy disc which can also be easily lengthened, and can partly show outside the side. Conventional floppy discs can be used by the drive in the usual manner. In that case, the connection head only purpose is to close the insertion slot of the floppy disc.

Another advantage of this arrangement is to allow users of present drives to personally and inexpensively modify their drives, and adapt them to floppy discs with a module, using a kit adapted to each type of drive, and which would include the connection head and its mechanical attachments, a flexible conductor, a standard connector for the link to the bus and a set of logical circuits to link the computer and the Another advantage of this arrangement is the possibility to modify the standard floppy discs by the incorporation of an added removable element.

It is obvious that the modules displayed in these examples in a particular location can be placed anywhere, as long as enough room is available, and this with all types of floppy or hard discs. Also, there may be more than one module per floppy or hard disc.

INDENTATION OF THE SHUTTER

The closing shutter 23a of said floppy disc can be extended to the right, in order to cover and protect the module connectors, which can be placed in this right corner. (FIG. 16).

An indentation 38 on the front edge of the shutter allows, according to the invention, the lever arm OUV of the said shutter to have a grip on the front edge of the shutter and not to touch the connectors eventually located on the floppy disc front edge. (FIG. 21 and 22).

GROUP-HOLDER

Should the module be necessary during a whole continuous working session, and if this work requires the presence of several floppy discs and therefore several modules, the modules, if they are removable, can, according to the invention, be joined together on a holder 48, that we will call "group holder", which can be adapted to the normal connection head, or to a specific connection head, which will be located outside the floppy disc drive or outside the computer, or inside, and then accessible by a properly shaped opening 49. (FIG. 41).

These modules can also be directly linked by direct inter connection, according to the invention, in a multi-level pattern similar to electrical plugs which can be plugged into each other. The group holder 48 can then be compared to a multiple plug.

The perfect embodiment of such a multi-level pattern would be one where each module possesses male connectors on one side and female connectors on the other side, those connectors being linked by a bus.

Thus, the different modules described above will be linked to the one bus made up of the succession of the individual busses from the several modules M.

These arrangements eliminate the necessity to change the floppy discs in the drive as they are needed during the work.

The group-holder 48 allows, according to the invention, to group several modules on a same connection head, the shape of which is adapted if necessary.

The group-holder 48 can eventually be fitted, according to the invention, with a battery 42 or a photo cell 41, with a keyboard 43 and with a display 40 in order to communicate confidentially with the modules. The group-holder, according to the invention, is fitted with its own connectors 56 which ensure the link with the connection head. Those connectors can advantageously be the extension of the flexible, removable own bus of the group-holder.

FIRST PREFERRED EMBODIMENT

The group-holder can also be made, (FIG. 38), according to the invention, out of a very narrow U shaped section 48E, with its sides having indentations 55 which allow the handling of the modules. The connectors of the said modules are in contact with the connectors of the group-holder located in the bottom, or in the sides of the U shaped section.

SECOND PREFERRED EMBODIMENT

The shape of the group-holder can be, according to the invention, a simple slide 48A, or a double slide 48B, or a multiple 48C, into which the module M is slid. (FIG. 29 to 32).

A bus 49, located on the bottom of the slide and/or on its sides, ensures the link with the modules.

This bus 49 can be made, according to the invention, of conductors 50 parallel to the slide and so located as to be in contact with the connectors of the module M. Each module can be individually addressed, using the internal logic of selection L/S.

This bus can be a part of the slide, or as a better option, according to the invention, be made of a flexible-metal covered tape 51, which can be easily and inexpensively changed in case of wear. This tape can be fitted, according to the invention, with an elastic layer 52, or can be laid upon such an elastic base, in order to improve the quality of the contacts. (FIG. 32).

The slide which constitutes the frame of the group-holder can be advantageously build out of inexpensive metal or plastic sections. This flexible removable bus of the group-holder can be fixed by an adhesive coating and/or can be kept in place by a spring.

Said bus can be coated with a precious metal, the coating being limited to the spots which are in contact with the connectors 14 of the modules.

THIRD PREFERRED EMBODIMENT

The group-holder can also be built, according to the invention, in the shape of a box 48D with an embedded or sliding cover 54. Said cover, as well as the bottom of the box, can be fitted with a fixed bus 49 or a removable bus 51. The box can also be fitted with two covers and accessed from top or bottom 54. (FIGS. 33 to 38).

These examples are only illustrative. They imply no limitation in any way to the scope of the invention.

I claim:

1. A data processing system comprising:
   a) a computer;
   b) a disk drive for reading from and/or writing to removable disks and having a connector linked to the computer and accessible through a disk-introduction slot of the disk drive;
   c) a removable hybrid memory unit which can be read from or written to by said disk drive, said hybrid memory unit includes a first housing portion which contains a rotary mass storage element and a second housing portion which contains one or more removable electronic modules each provided with a connector; and
   d) a group holder having several receptacles, each able to temporarily receive one of said one or more electronic modules and each having an input connector structure which cooperates with the connector of the electronic module received therein, each of the input connectors being linked to an integrated output connector which is able to interface with said connector of said computer disk drive.

2. A data processing system comprising:
   a) a computer;
   b) a disk drive for reading from and/or writing to removable disks and having a connector linked to the computer and accessible through a disk-introduction slot of the disk drive;
   c) a removable disk type mass storage device;
   d) plural electronic modules provided with connectors; and
   e) a group holder having plural housings able to receive said plural electronic modules, each housing having an input connector for cooperating with a connector of one of said plural electronic modules received therein, each of said input connectors being linked to an integrated output connector; wherein said output connector is able to interface with said connector of said disk drive.

3. The data processing system of claim 1 or claim 2, wherein at least one electronic module includes an internal selection logic.

4. The data processing system of claim 1 or 2, wherein said output connector is able to interface with a connector of said computer accessed via a dedicated aperture.

* * * * *